US008599546B2

(12) United States Patent
Nagasaki

(10) Patent No.: US 8,599,546 B2
(45) Date of Patent: Dec. 3, 2013

(54) ELECTRONIC APPARATUS AND HINGE

(75) Inventor: Tatsuki Nagasaki, Nagano (JP)

(73) Assignee: Sony Corporation (JP)

( * ) Notice: Subject to any disclaimer, the term of this patent is extended or adjusted under 35 U.S.C. 154(b) by 154 days.

(21) Appl. No.: 13/339,515

(22) Filed: Dec. 29, 2011

(65) Prior Publication Data
US 2012/0176740 A1    Jul. 12, 2012

(30) Foreign Application Priority Data

Jan. 6, 2011  (JP) ................ P2011-000954

(51) Int. Cl.
G06F 1/16    (2006.01)

(52) U.S. Cl.
USPC ............. 361/679.27; 455/575.4; 16/322; 248/220.21

(58) Field of Classification Search
USPC ......... 439/220, 489, 345, 326; 248/280.11, 248/917, 74.1, 201, 220.21, 122.1, 556; 361/679.55, 679.01, 679.32, 679.06, 361/679.21, 679.53, 679.47, 679.4, 679.08, 361/679.27, 679.09, 679.28, 679.11, 361/679.56; 455/566, 575.3, 556.1, 575.4, 455/569.1, 575.1; 16/382, 321, 303, 370, 16/326, 319, 322, 367, 330; 165/104.19, 165/104.33, 80.3, 63, 122
See application file for complete search history.

(56) References Cited

U.S. PATENT DOCUMENTS

| 8,405,978 B2 * | 3/2013 | Okutsu ............. 361/679.55 |
| 2012/0046081 A1 * | 2/2012 | Riddiford et al. ......... 455/566 |
| 2013/0077212 A1 * | 3/2013 | Nakajima ............ 361/679.01 |

FOREIGN PATENT DOCUMENTS

| JP | 2007-046269 A | 2/2007 |
| JP | 2008-285925 A | 11/2008 |

* cited by examiner

Primary Examiner — Hung Duong
(74) Attorney, Agent, or Firm — Lerner, David, Littenberg, Krumholz & Mentlik, LLP

(57) ABSTRACT

A hinge includes: a first link rotatably attached to a first housing at one end thereof; a second link attached to a second housing with a pin at one end thereof; a first arm rotatably attached to the second housing at one end thereof and rotatably attached to the first link at another end thereof; and a second arm rotatably attached to the first housing at one end thereof and rotatably attached to the second link at another end thereof.

6 Claims, 6 Drawing Sheets

ELECTRONIC APPARATUS AND HINGE

FIELD

The present disclosure relates to an electronic apparatus and a hinge. More particularly, the present disclosure relates to an electronic apparatus and a hinge or a movable part of the apparatus which allows the apparatus to appear more elegant from the cosmetic point of view while providing the apparatus with improved durability.

BACKGROUND

In the related art, a hidden hinge is used in a part of an apparatus which is opened and closed, e.g., a door or lid of the apparatus. For example, a door hinge of an apparatus is mounted such that it is not visible on the exterior of the apparatus when the door is closed (or opened).

Specifically, a hidden hinge has a pair of arms attached to, for example, a door and a door frame, and the two arms are connected by a rotating pin which constitutes a rotational axis of the door. The arms are contained in respective recesses on end faces of the door and the door frame when the door is closed (or opened) and the end faces consequently adjoin each other.

The use of such hidden hinges allows furniture and the like to be designed more elegantly.

Techniques associated with hidden hinges having an automatic closing function have been also proposed (for example, see JP-A-2007-046269 (Patent Document 1)).

SUMMARY

Recently, more and more electronic apparatus are provided with highly elegant appearance. Many such electronic apparatus are configured such that they can be carried in a lapped state for improved portability.

In order to provide an electronic apparatus with highly elegant appearance, it is essential to design the apparatus for a lighter weight, a smaller size, and a smaller thickness. For example, there are demands for further reductions in the thickness of apparatus such as notebook type personal computers and mobile phones.

However, a hidden hinge according to the related art such as that disclosed in Patent Document 1 employs a slide mechanism. In the case of a hidden hinge having a slide mechanism, it is difficult to keep the slide mechanism itself small because the strength of a mounting plate for the hinge must be kept at a certain level in a region thereof having a hole in which an end of the hinge is slid. For this reason, it has been difficult to keep the thickness of an apparatus having such a mechanism small.

Since the slide mechanism is designed such that the hinge is slid with the end thereof engaged with the hole of the mounting plate, there is concern about wear of the mechanism attributable to friction, and the mechanism must therefore be designed for sufficient durability. In order to achieve sufficient durability, materials usable for the mechanism are limited, which has hindered efforts toward lighter apparatus, for example.

Under the circumstance, it is desirable to provide an apparatus having a movable part with more elegant appearance while keeping the durability of the apparatus sufficiently high.

An embodiment of the present disclosure is directed to an electronic apparatus including a first housing and a second housing rotating about a rotational axis and a hinge. The hinge includes a first link rotatably attached to the first housing at one end thereof, a second link attached to the second housing with a pin at one end thereof, a first arm rotatably attached to the second housing at one end thereof and rotatably attached to the first link at another end thereof, and a second arm rotatably attached to the first housing at one end thereof and rotatably attached to the second link at another end thereof.

The first housing or the second housing may be rotated by the hinge depending on the usage of the electronic apparatus and the hinge may be inserted into the first housing or the second housing when the first housing or the second housing is rotated.

The first link and the second link of the hinge may be different from each other in terms of straight length.

The first arm and the second arm of the hinge may have a curved shape, and the first link and the second link of the hinge may have a straight shape.

The first housing may be a housing including a display, and the second housing may be a housing including a keyboard. Thus, the electronic apparatus including the first housing and the second housing may serve as a notebook type personal computer.

According to the embodiment of the present disclosure, the first link is rotatably attached to the first housing at one end thereof; the second link is attached to the second housing with a pin at one end thereof; the first arm is rotatably attached to the second housing at one end thereof and rotatably attached to the first link at another end thereof; and the second arm is rotatably attached to the first housing at one end thereof and rotatably attached to the second link at another end thereof.

Another embodiment of the present disclosure is directed to a hinge including a first link rotatably attached to a first housing at one end thereof, a second link attached to a second housing with a pin at one end thereof, a first arm rotatably attached to the second housing at one end thereof and rotatably attached to the first link at another end thereof, and a second arm rotatably attached to the first housing at one end thereof and rotatably attached to the second link at another end thereof.

According to the embodiment of the present disclosure, the first link is rotatably attached to the first housing at one end thereof; the second link is attached to the second housing with a pin at one end thereof; the first arm is rotatably attached to the second housing at one end thereof and rotatably attached to the first link at another end thereof; and the second arm is rotatably attached to the first housing at one end thereof and rotatably attached to the second link at another end thereof.

According to the embodiments of the present disclosure, an apparatus having a movable part can be provided with elegant appearance and improved durability.

DETAILED DESCRIPTION

An embodiment of the present disclosure will now be described with reference to the drawings.

First, a hidden hinge according to the related art will be described.

Figure 1:
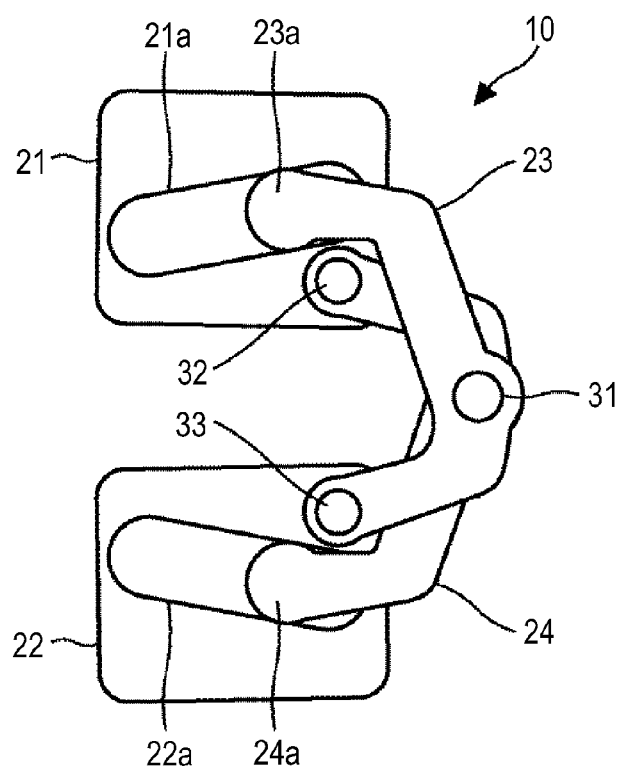
FIG. 1 is an illustration of an exemplary hidden hinge according to the related art.

FIG. 1 is an illustration of a hidden hinge 10 according to the related art which is presented by way of example. As shown in the figure, the hidden hinge 10 includes a mounting plate 21 and a mounting plate 22. For example, the mounting plates 21 and 22 are attached to a first housing and a second housing of an apparatus, respectively.

The first housing may be the body of a display of a notebook type personal computer which can be carried in a lapped state, and the second housing may be the main body of the notebook type personal computer.

The hidden hinge 10 includes arms 23 and 24, and the arms 23 and 24 are connected by a pin 31. For example, an imaginary line extending through the center of the pin 31 perpendicularly to the plane of the drawing constitutes a rotational axis of the display of the notebook type personal computer (or main body of the personal computer).

An end 23a of the arm 23 is engaged with a hole 21a of the mounting plate 21 and slid the hole 21a in the engaged state substantially in the horizontal direction of the drawing (in a slightly oblique direction). Similarly, an end 24a of the arm 24 is engaged with a hole 22a of the mounting plate 22 and slid in the hole 22a in the engaged state substantially in the horizontal direction of the drawing (in a slightly oblique direction).

Another end of the arm 23 is connected with the mounting plate 22 by a pin 33. Similarly, another end of the arm 24 is connected with the mounting plate 21 by a pin 32.

The parts of the hidden hinge 10 connected with pins are rotatable about the pins serving as axes.

In a case wherein the hidden hinge 10 is mounted in a notebook type personal computer, the notebook type personal computer is in a lapped state (or a closed state) when the hinge is in the state shown in FIG. 1.

Figure 2:
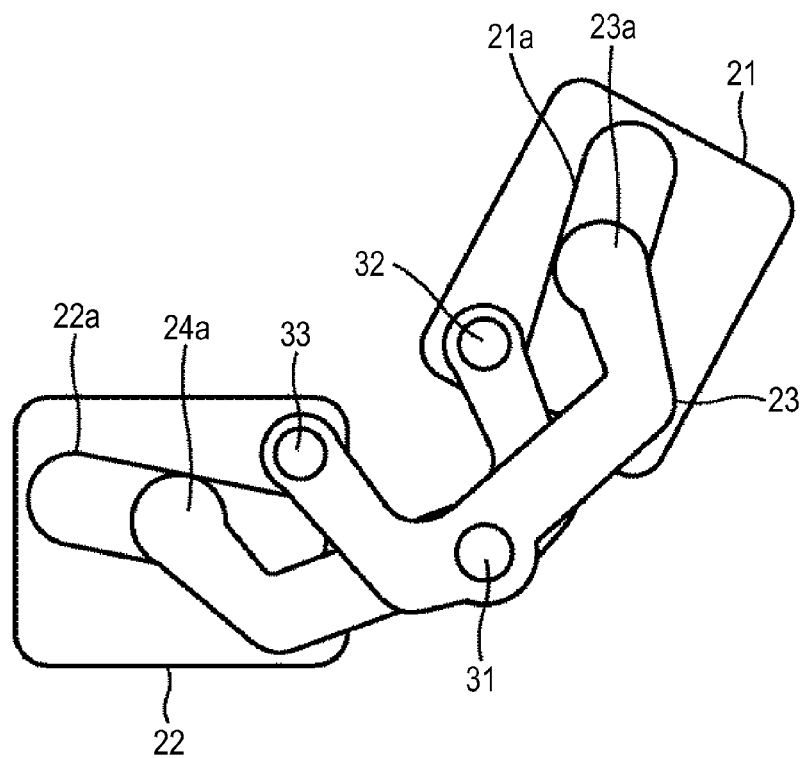
FIG. 2 is an illustration of a notebook type personal computer having the hidden hinge shown in FIG. 1 mounted therein showing the state of the hidden hinge observed when the computer is opened.

FIG. 2 is an illustration of the hidden hinge 10 in an open state of the notebook type personal computer in the case wherein the hidden hinge 10 is mounted in the notebook type personal computer. For example, when a user raises the display of the notebook type personal computer, the end 23a of the arm 23 slides in the hole 21a, and the end 24a of the arm 24 slides in the hole 22a. Thus, the display is rotated about the rotational axis of the pin 31.

Each of the arms 23 and 24 has a curved shape to allow the notebook type personal computer to be opened and closed.

With the hidden hinge 10 mounted as thus described, the hidden hinge 10 can be kept invisible for a user when the notebook type personal computer is opened to expose the display.

As described above, the hidden hinge according to the related art as shown in FIG. 1 employs a slide mechanism. It is difficult to provide the hidden hinge having a slide mechanism with a small size because the strength of the mounting plate 21 or mounting plate 22 must be sufficiently kept in the region thereof having the hole 21a or 22a in which the end 23a or 24a of the respective arm of the hinge is slid.

For example, let us assume that the length of the mounting plate 21 in the vertical direction of FIG. 1 is reduced from the illustrated length. Then, the mounting plate 21 may be broken when the end 23a of the arm 23 slides in the hole 21a in engagement therewith substantially in the horizontal direction of the figure (in a lightly oblique direction).

For example, the mounting plate 21 is attached to a display of a notebook type personal computer. The thickness of the notebook type personal computer cannot be smaller than the length of the mounting plate 21 in the vertical direction of FIG. 1.

Since the slide mechanism is designed such that the hinge is slid with the end thereof engaged with the hole of the mounting plate, there is concern about wear of the mechanism attributable to friction, and the mechanism must therefore be designed for sufficient durability. In order to achieve sufficient durability, materials usable for the mechanism are limited.

As thus described, the use of hidden hinges according to the related art has hindered efforts toward apparatus having a smaller thickness and a lighter weight in some cases.

Under the circumstance, an embodiment of the present disclosure makes it possible to provide a hidden hinge different from hidden hinges according to the related art. Specifically, a hidden hinge can be provided such that an apparatus employing the hinge can be made thin and lightweight with the durability of the hinge kept sufficiently high.

Figure 3:
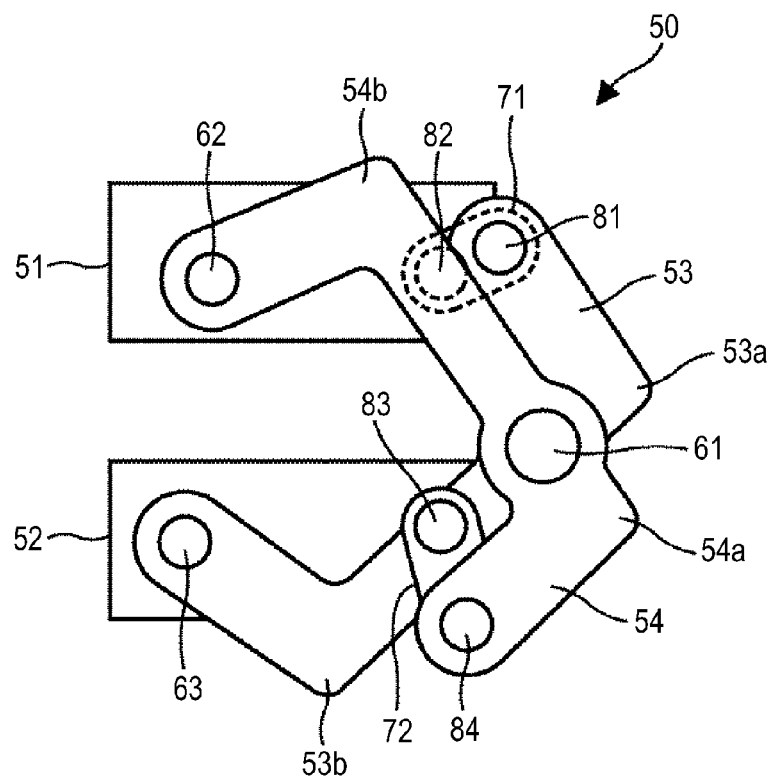
FIG. 3 is an illustration of an exemplary hidden hinge according to an embodiment of the present disclosure.

FIG. 3 is an illustration of a hidden hinge 50 according to an embodiment of the present disclosure. As shown in the figure, the hidden hinge 50 includes a mounting plate 51, and a mounting plate 52. For example, the mounting plates 51 and 52 are attached to a first housing and a second housing of an apparatus, respectively.

Instead of providing the mounting plates 51 and 52, an arm 53, an arm 54, a link 71, and a link 72 may be directly mounted on the first and second housings, respectively.

The first housing may be the body of a display of a notebook type personal computer which can be carried in a lapped state, and the second housing may be the main body of the notebook type personal computer.

The hidden hinge 50 includes the arms 53 and 54, and the arms 53 and 54 are connected by a pin 61. For example, an imaginary line extending through the center of the pint 61 perpendicularly to the plane of the figure constitutes a rotational axis of the display of the notebook type personal computer (or the main body of the computer.

Each of the arms 53 and 54 has a curved shape to allow the notebook type personal computer to be opened and closed. The arm 53 of this embodiment is curved at corners 53a and 53b. The arm 54 of this embodiment is curved at corners 54a and 54b.

Further, the hidden hinge 50 includes the links 71 and 72. The links 71 and 72 have a straight shape unlike the arms 53 and 54.

One end of the arm 53 is connected to the mounting plate 52 by a pin 63. Another end of the arm 53 is connected to the link 71 by a pin 81. One end of the arm 54 is connected to the mounting plate 51 by a pin 62. Another end of the arm 54 is connected to the link 72 by a pin 84.

One end of the link 71 is connected to the arm 53 by the pin 81. Another end of the link 71 is connected to the mounting plate 51 by a pin 82. One end of the link 72 is connected to the arm 54 by the pin 84. Another end of the link 72 is connected to the mounting plate 52 by a pin 83.

Each part of the hinge 50 connected with a pin can be rotated about the pin serving as an axis.

In a case wherein the hidden hinge 50 is mounted in a notebook type personal computer, the notebook type personal computer is in a lapped state (or a closed state) when the hinge is in the state shown in FIG. 3.

Figure 4:
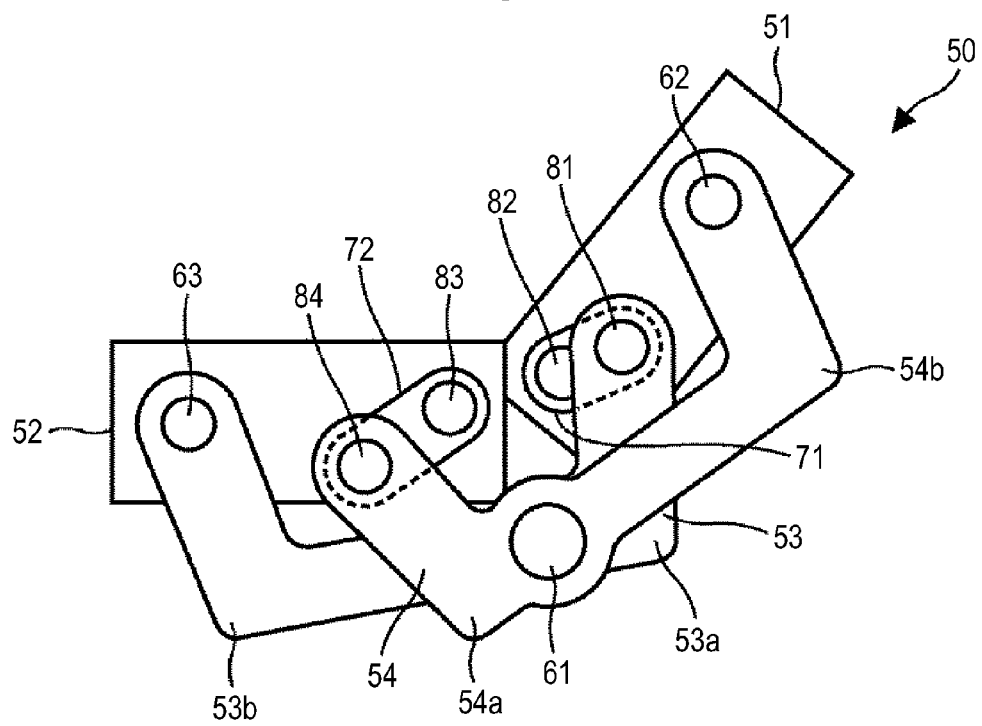
FIG. 4 is an illustration of a notebook type personal computer having the hidden hinge shown in FIG. 3 mounted therein showing the state of the hidden hinge observed when the computer is opened.

FIG. 4 is an illustration of the hidden hinge 50 in an open state of the notebook type personal computer in the case wherein the hidden hinge 50 is mounted in the notebook type personal computer. For example, when a user raises the display of the notebook type personal computer, the link 71 rotates about the pin 82 serving as an axis, and the link 72 rotates about the pin 83 serving as an axis, whereby the display is rotated about the rotational axis of the pin 61.

In the examples shown in FIGS. 3 and 4, the link 71 of the hidden hinge 50 is shorter than the link 72. The reason is as follows. For example, in the case wherein the hidden hinge 50 is mounted in a notebook type personal computer, when a user raises the display, a lower end of the display may abut on the main body of the computer to disable the display from moving if the length of the link 71 is equal to or greater than the length of the link 72.

Specifically, if the link 71 is formed with a greater length, when the mounting plate 51 is oriented substantially perpendicularly to the mounting plate 52 as a result of the rotation of the link 71 about the pin 82, the mounting plate 51 is moved a great distance in the top-to-bottom direction of the figure. Then, a lower end of the display to which the mounting plate 51 is attached can abut on the main body of the computer to stop the movement of the display.

It is therefore desirable to form the link 71 shorter than the link 72 when the hidden hinge 50 is to be mounted in a personal computer or the like. Obviously, the link 71 may be formed longer when the hidden hinge 50 is to be mounted in an apparatus other than personal computers and the like.

In the case of the hidden hinge 50 shown in FIG. 3, the vertical distance required for accommodating the arms can be shorter the distance required for the arms of the hidden hinge 10 shown in FIG. 1.

For example, in the case of the hinge 10 shown in FIG. 1, the vertical distance required for accommodating the arms is the distance from the end 23a of the arm 23 to the end 24a of the arm 24. On the contrary, in the case of the hinge 50 shown in FIG. 3, the vertical distance required for accommodating the arms is the distance from the corner 54b of the arm 54 to the corner 53b of the arm 53.

The hidden hinge 50 shown in FIG. 3 is configured such that an imaginary line connecting the mounting position of the pin 62 and the mounting position of the pin 82 will horizontally extends substantially in the middle of the mounting plate 51. The hinge is also configured such that an imaginary line connecting the mounting position of the pin 63 and the mounting position of the pin 83 will horizontally extends substantially in the middle of the mounting plate 52. Thus, the vertical distance required for accommodating the arms can be made small.

As a result, the use of the hidden hinge 50 according to the embodiment of the present disclosure allows the first and second housings of the notebook type personal computer to be provided with a smaller thickness.

Further, the hidden hinge 50 shown in FIG. 3 has no slide mechanism unlike the hidden hinge 10 shown in FIG. 1. As described above, a slide mechanism slides with an end of an arm of the mechanism engaged with a hole of a mounting plate. There is concern about wear of the mechanism attributable to friction or the like, and the mechanism must therefore be designed to have sufficient durability.

The use of the hidden hinge 50 according to the embodiment of the present disclosure allows the first and second housings of the notebook type computer to be provided with sufficient durability even if the housings are formed with a smaller thickness.

Figure 5:
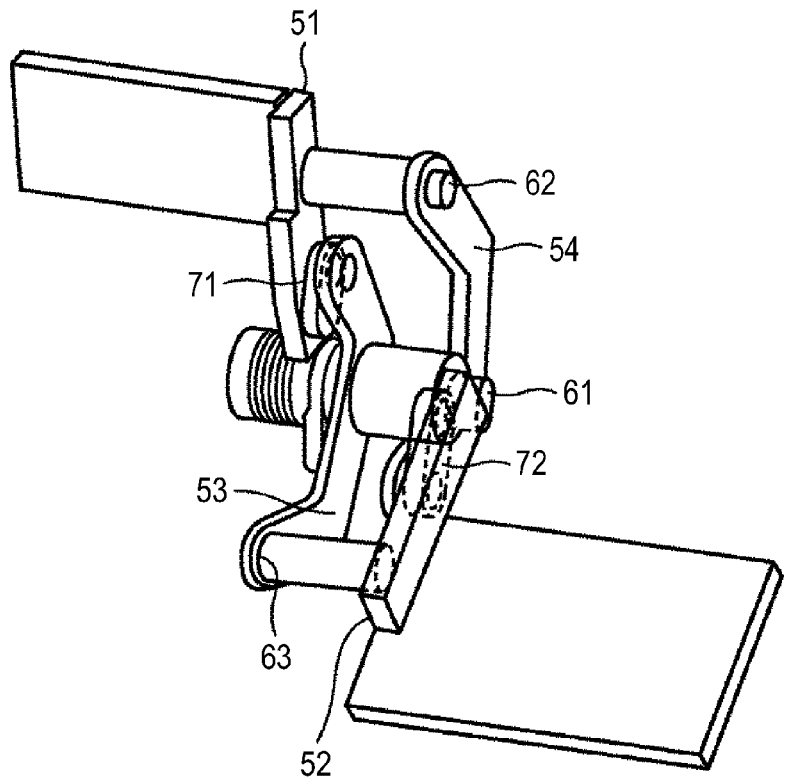
FIG. 5 is a view of the hidden hinge shown in FIG. 4 taken from a different angle.

FIG. 5 is a view of the hidden hinge 50 in FIG. 4 taken from a different angle. As shown in the figure, the hidden hinge 50 has a sufficient opening/closing range. The opening/closing range of the hidden hinge 50 itself is the range from about 0° to about 180°.

Figure 6:
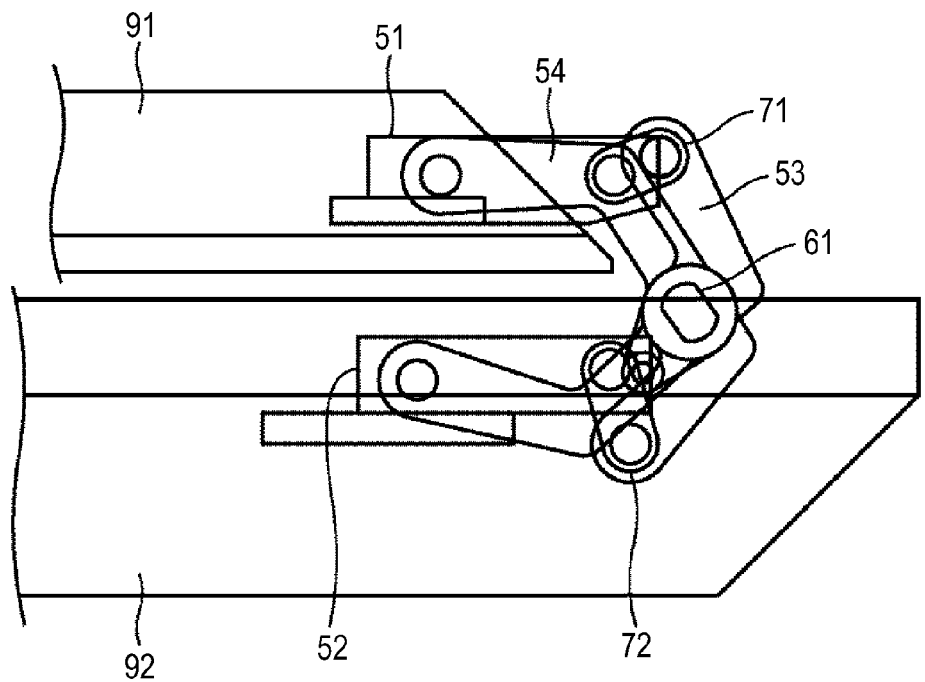
FIG. 6 is an illustration showing an exemplary case wherein the hidden hinge shown in FIG. 3 is mounted in a notebook type personal computer.

FIG. 6 is an illustration of an exemplary case in which a hidden hinge 50 as shown in FIG. 3 is mounted in a notebook type personal computer. For example, a housing 91 shown in FIG. 6 is the body of a display of the notebook type personal computer, and a housing 92 is the main body of the notebook type personal computer. FIG. 6 shows a closed state of the notebook type personal computer. For the sake of convenience, a see-through view of the apparatus is presented to show the interior of the housings 91 and 92.

In this example, the housing 91 has an inclined surface at an end thereof which is shown on the right side of the figure. In the closed state of the notebook type computer, a part of the hidden hinge 50 is exposed on the top of the housing 92.

Figure 7:
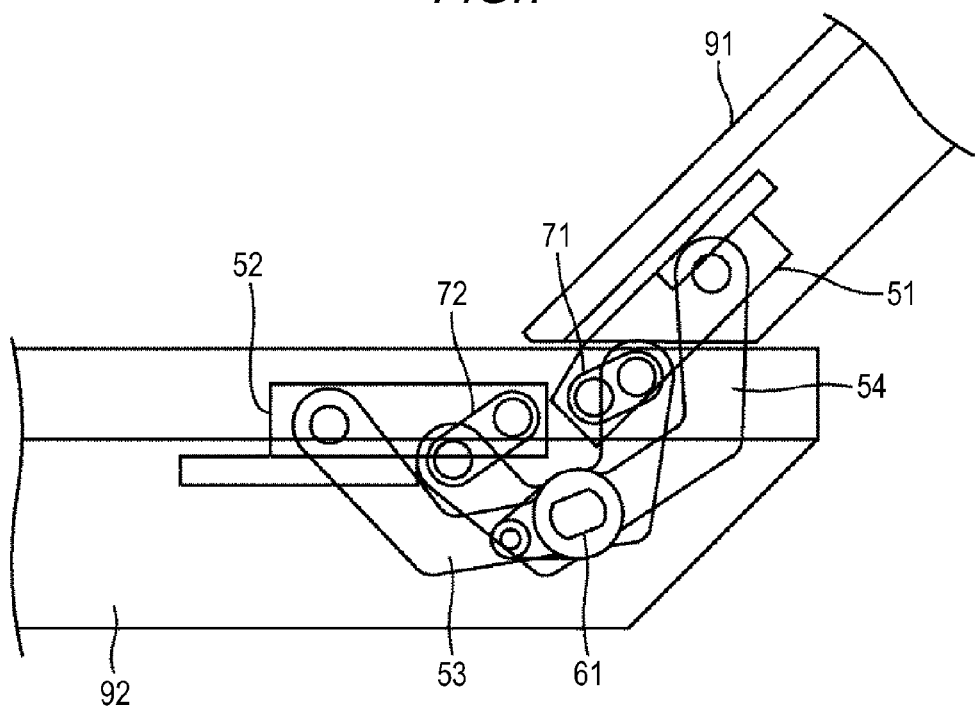
FIG. 7 is an illustration showing an open state of the notebook type personal computer shown in FIG. 6.

FIG. 7 is an illustration of the notebook type personal computer of FIG. 6 showing an open state of the same. For example, when a user raises the housing 91 (display) of the notebook type personal computer shown in FIG. 7, the link 71 rotates about the pin 82, and the link 72 rotates about the pin 83. Thus, the display is rotated about the rotational axis of the pin 61.

As shown in FIG. 7, the hidden hinge 50 is inserted in the housing 92 or the housing 91 to keep it invisible from outside. For the same of convenience, the figure is represented as a see-through view of the apparatus to show the interior of the housings 91 and 92.

Figure 8:
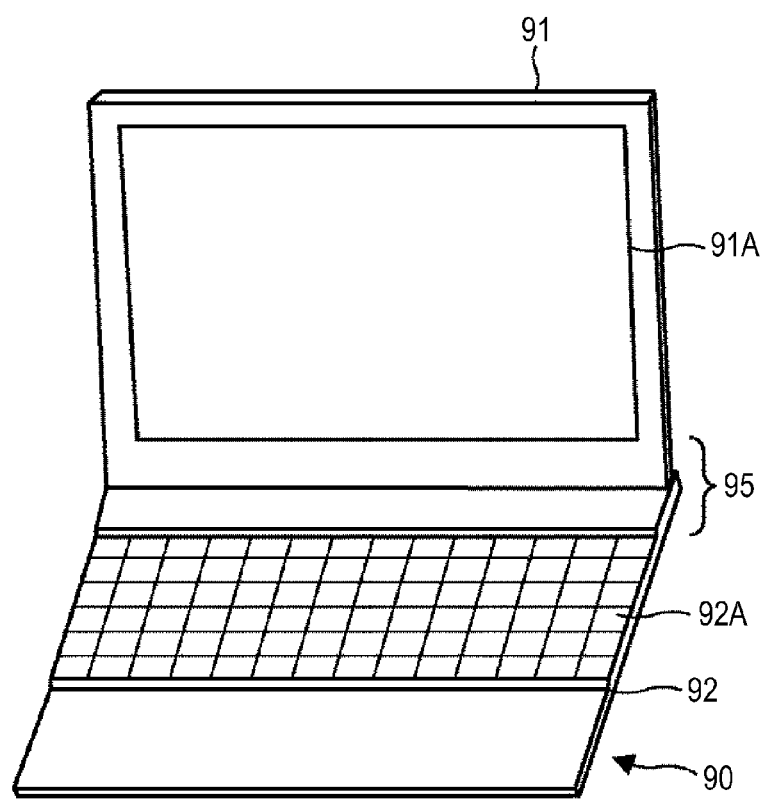
FIG. 8 is a view of the notebook type personal computer shown in FIG. 7 taken from a different angle.

FIG. 8 is a view of the notebook type personal computer 90 in FIG. 7 taken from a different angle.

As shown in FIG. 8, when the notebook type personal computer 90 is in the open state, a screen 91a on the housing 91 or the display is exposed, and a user can operate a keyboard 92a on the housing 92. In this state, the hinge is invisibly hidden in a region 95 where the housings 91 and 92 are connected with each other.

When the hidden hinge 50 is used as thus described, the notebook type personal computer 90 can be provided with elegant appearance.

According to the above description, the arms and links of the hidden hinge 50 are connected using pins to mount those elements in a rotatable manner. However, it is not necessarily required to use pins as long as the arms and pins can be rotated. For example, instead of providing the hidden hinge 50 with the pins 61, 62, 63, 81, 82, 83 and 84, the ends of the arms 53 and 54 and the ends of the links 71 and 72 may be formed as engaging portions to allow those elements to be rotatably engaged.

According to the above description of the embodiment, the arms 53 and 54 of the hidden hinge 50 are connected by the pin 61, but it is not necessarily required to connect the arms 53 and 54 with each other. Specifically, it is not required to connect the arms 53 and 54 with each other as long as the hidden hinge 50 can be configured such that it serves as the rotational axis of the display of the notebook type personal computer (or the main body of the computer) in a position corresponding to the position of the pin 61.

Figure 9:
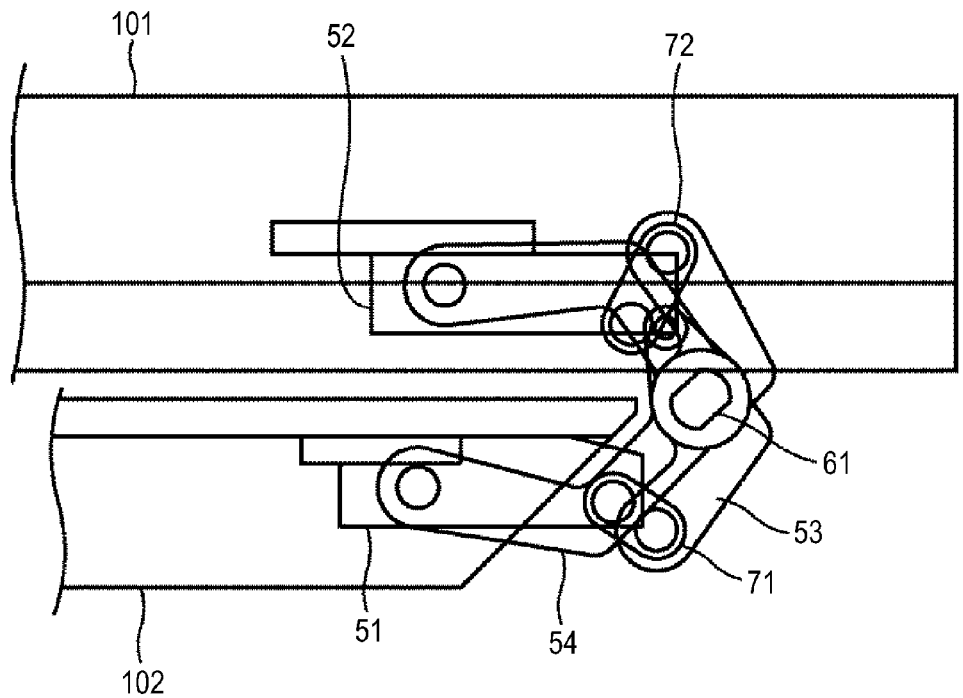
FIG. 9 is an illustration showing another exemplary case wherein the hidden hinge shown in FIG. 3 is mounted in a notebook type personal computer.

FIG. 9 is an illustration of another exemplary case in which a hidden hinge 50 as shown in FIG. 3 is mounted in a notebook type personal computer. For example, a housing 101 shown in FIG. 9 is the body of a display of the notebook type personal computer, and a housing 102 is the main body of the notebook type personal computer. FIG. 9 shows a closed state of the notebook type personal computer. For the sake of convenience, a see-through view of the apparatus is presented to show the interior of the housings 101 and 102.

The example shown in FIG. 9 is different from the example shown in FIG. 6 in that the housing 102 has an inclined surface at an end thereof which is the right end of the housing in the illustration such that a lower end of the display protrudes below the main body of the notebook type personal computer when the computer is opened. When the notebook personal computer is closed, a part of the hidden hinge 50 is exposed in a region under the housing 101. When a part of the hidden hinge 50 is exposed under the housing 101 as shown, it is reasonable to say that the hidden hinge 50 is unlikely to be visible for a user in the closed state of the notebook type personal computer.

In the example shown in FIG. 9, the mounting plates 51 and 52 of the hidden hinge 50 are mounted in a vertical positional relationship with each other which is the reverse of the relationship between the elements shown in FIG. 6. Similarly, the arms and the links are mounted in a vertical positional relationship which is the reverse of the relationship between the elements shown in FIG. 6.

Figure 10:
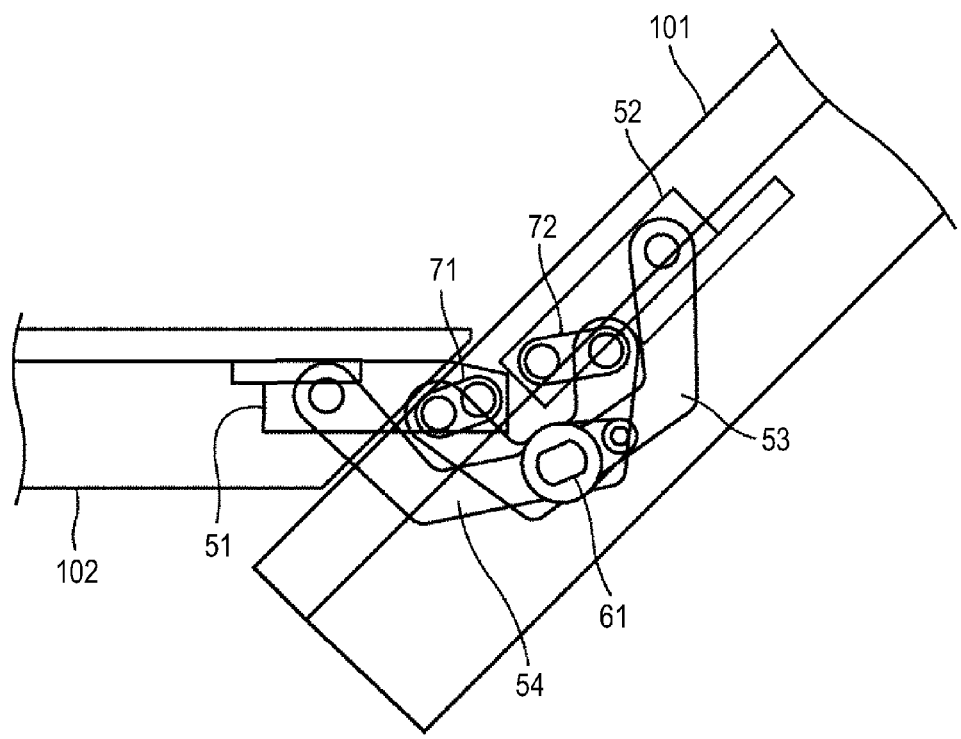
FIG. 10 is an illustration showing an open state of the notebook type personal computer shown in FIG. 9.

FIG. 10 is an illustration of the notebook type personal computer of FIG. 9 showing an open state of the same. For example, when a user raises the housing 101 (display) of the notebook type personal computer shown in FIG. 10, the link 71 rotates about the pin 82, and the link 72 rotates about the pin 83. Thus, the display is rotated about the rotational axis of the pin 61.

As shown in FIG. 10, the hidden hinge 50 is inserted in the housing 102 or the housing 101 to keep it invisible from outside. For the same of convenience, the figure is represented as a see-through view of the apparatus to show the interior of the housings 101 and 102.

Referring further to FIG. 10, a lower end of the display (housing 101) protrudes below the main body of the computer (housing 102).

Figure 11:
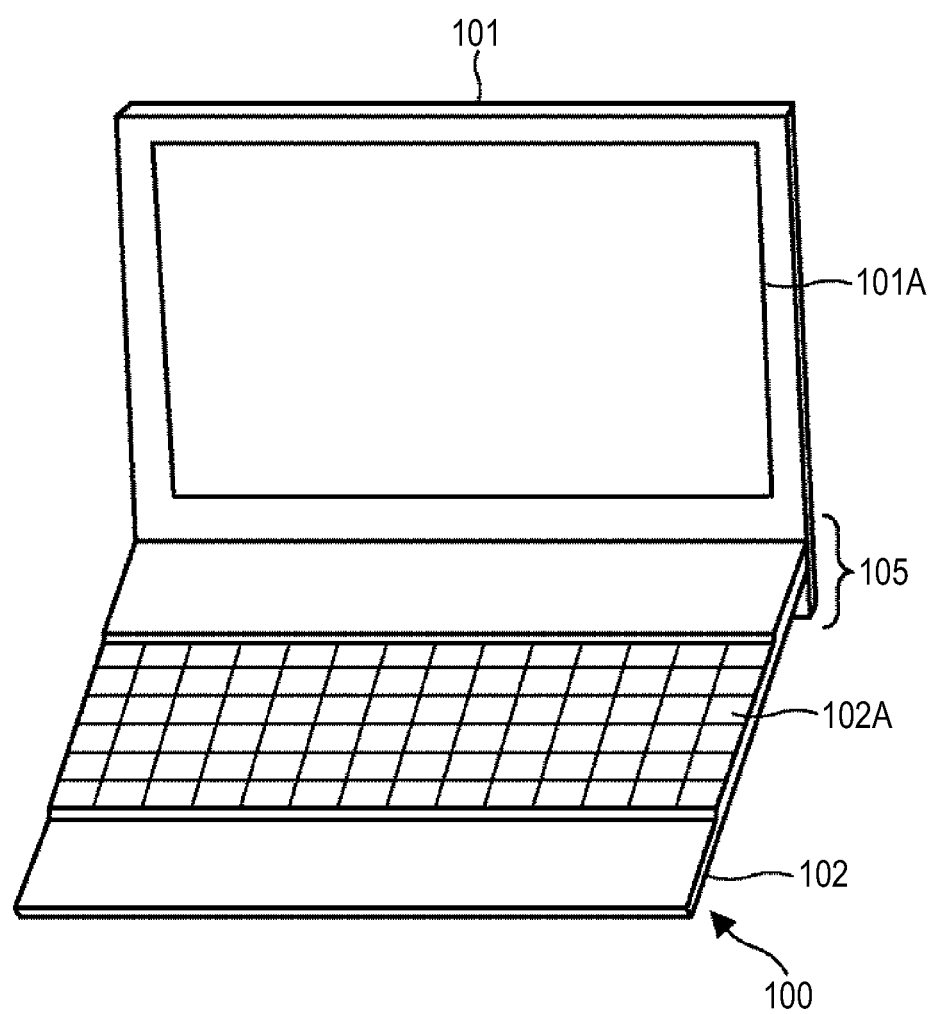
FIG. 11 is a view of the notebook type personal computer shown in FIG. 10 taken from a different angle.

FIG. 11 is a view of the notebook type personal computer 100 in FIG. 10 taken from a different angle.

As shown in FIG. 11, when the notebook type personal computer 100 is in the open state, a screen 101A on the housing 101 or the display is exposed, and a user can operate a keyboard 102A on the housing 102. In this state, the hinge is invisibly hidden in a region 105 where the housings 101 and 102 are connected with each other.

The example shown in FIG. 11 is different from the example shown in FIG. 8 in that the key pads on the keyboard 102A are slightly tilted toward a user because a lower end of the display (housing 101) protrudes below the main body (housing 102). Thus, a user can operate the key pads with improved ease.

When the hidden hinge 50 is used as thus described, the notebook type personal computer can be provided with elegant appearance and high functionality.

A shrinkable cover like bellows may be provided in a region where a part of the hinge 50 is exposed as shown in FIG. 6 or 9 to cover the exposed part, which will make the appearance of the notebook type personal computer 100 more elegant.

While applications of the hidden hinge 50 to personal computers have been described above, the device may be used in other types of apparatus. According to the present disclosure, an apparatus having a movable part can be provided with elegant appearance while achieving high durability.

The present disclosure is not limited to the above-described embodiment, and various modifications may be made without departing from the spirit of the present disclosure.

The present disclosure contains subject matter related to that disclosed in Japanese Priority Patent Application JP 2011-000954 filed in the Japan Patent Office on Jan. 6, 2011, the entire content of which is hereby incorporated by reference.

What is claimed is:

1. An electronic apparatus comprising:
    a first housing and a second housing rotating about a rotational axis; and
    a hinge including
    a first link rotatably attached to the first housing at one end thereof,
    a second link attached to the second housing with a pin at one end thereof,
    a first arm rotatably attached to the second housing at one end thereof and rotatably attached to the first link at another end thereof, and
    a second arm rotatably attached to the first housing at one end thereof and rotatably attached to the second link at another end thereof.

2. An electronic apparatus according to claim 1, wherein the first housing or the second housing is rotated by the hinge depending on the usage of the electronic apparatus; and
    the hinge is inserted into the first housing or the second housing when the first housing or the second housing is rotated.

3. An electronic apparatus according to claim 2, wherein the first link and the second link of the hinge are different from each other in terms of straight length.

4. An electronic apparatus according to claim 3, wherein the first arm and the second arm of the hinge have a curved shape; and
    the first link and the second link of the hinge have a straight shape.

5. An electronic apparatus according to claim 4, wherein the first housing is a housing including a display; and
    the second housing is a housing including a keyboard, the electronic apparatus including the first housing and the second housing serving as a notebook type personal computer.

6. A hinge comprising:
    a first link rotatably attached to a first housing at one end thereof;
    a second link attached to a second housing with a pin at one end thereof;
    a first arm rotatably attached to the second housing at one end thereof and rotatably attached to the first link at another end thereof; and
    a second arm rotatably attached to the first housing at one end thereof and rotatably attached to the second link at another end thereof.

* * * * *